(12) United States Patent
Salenbien (10) Patent No.: US 10,914,231 B2
(45) Date of Patent: Feb. 9, 2021

(54) HUB-LESS AND NUT-LESS TURBINE WHEEL AND COMPRESSOR WHEEL DESIGN FOR TURBOCHARGERS

(71) Applicant: Ryan Harold Salenbien, Maybee, MI (US)

(72) Inventor: Ryan Harold Salenbien, Maybee, MI (US)

( * ) Notice: Subject to any disclaimer, the term of this patent is extended or adjusted under 35 U.S.C. 154(b) by 11 days.

(21) Appl. No.: 16/413,952

(22) Filed: May 16, 2019

(65) Prior Publication Data

US 2020/0063652 A1 Feb. 27, 2020

Related U.S. Application Data

(60) Provisional application No. 62/720,212, filed on Aug. 21, 2018.

(51) Int. Cl.
| | |
|---|---|
| *F04D 17/10* | (2006.01) |
| *F02B 37/24* | (2006.01) |
| *F02B 39/00* | (2006.01) |
| *F01D 25/24* | (2006.01) |
| *F02C 6/12* | (2006.01) |

(52) U.S. Cl.
CPC .............. *F02B 37/24* (2013.01); *F01D 25/24* (2013.01); *F02B 39/00* (2013.01); *F02C 6/12* (2013.01); *F05D 2220/40* (2013.01); *F16C 2360/24* (2013.01)

(58) Field of Classification Search
CPC ........ F04D 29/30; F04D 29/32; F04D 29/321; F04D 29/24; F04D 29/242; F04D 29/284; F04D 29/322; F04D 29/324; F04D 17/10; F02B 37/24; F02B 39/00; F05D 2240/40
See application file for complete search history.

(56) References Cited

U.S. PATENT DOCUMENTS

| 7,455,251 B2 * | 11/2008 | Doering | F04D 7/045 241/185.6 |
|---|---|---|---|
| 2012/0269635 A1 * | 10/2012 | Xu | F01D 5/143 416/183 |
| 2016/0215787 A1 * | 7/2016 | Hall | B60K 13/04 |

FOREIGN PATENT DOCUMENTS

| EP | 2843236 B1 | 9/2016 |
|---|---|---|
| JP | 2017203427 A | 11/2017 |
| WO | 2014028214 A1 | 2/2014 |

OTHER PUBLICATIONS

International Search Report and Written Opinion issued in PCT/US2019/046553 dated Nov. 18, 2019.

\* cited by examiner

*Primary Examiner* — Aaron R Eastman
*Assistant Examiner* — Maxime M Adjagbe
(74) *Attorney, Agent, or Firm* — Harness, Dickey & Pierce, P.L.C.

(57) ABSTRACT

A turbocharger for an internal combustion engine is provided, where the turbocharger includes a housing, a shaft, a turbine wheel, and a compressor wheel. The shaft is rotatable with respect to the housing and defines a centerline. The turbine wheel is mounted to the shaft and is disposed within the housing. The compressor wheel is also mounted to the shaft and is disposed within the housing. The turbine wheel and/or the compressor wheel has a plurality of blades with leading edges that converge at an apex. The apex is aligned with the centerline. A method of constructing a turbocharger is also provided, where the method includes the step of performing a finishing operation on the turbine wheel and/or the compressor wheel to form an apex where the leading edges of the blades converge.

14 Claims, 9 Drawing Sheets

HUB-LESS AND NUT-LESS TURBINE WHEEL AND COMPRESSOR WHEEL DESIGN FOR TURBOCHARGERS

CROSS-REFERENCE TO RELATED APPLICATIONS

This application claims the benefit of U.S. Provisional Application No. 62/720,212, filed on Aug. 21, 2018. The entire disclosure of the above application is incorporated herein by reference.

FIELD

The subject disclosure generally relates to turbochargers for internal combustion engines. More particularly, improved turbine/exhaust wheel and compressor/intake wheel designs are disclosed, which improve fluid flow through a turbocharger to increase horsepower without changing the wheel diameter or geometry.

BACKGROUND

The statements in this section merely provide background information related to the present disclosure and may not constitute prior art.

A turbocharger is a turbine-driven forced induction device that increases the efficiency and power output of an internal combustion engine by forcing extra air into the combustion chamber compared to naturally aspirated engines. Turbochargers are used in a wide variety of internal combustion engines, including gas, diesel, alcohol, and methanol fueled engines. Turbochargers are used in engines to increase intake air flow with a resulting horsepower gain/advantage.

There remains a need for improvements to turbochargers including quicker spool-up, lighter weight, and increased air and horsepower output. This is particularly true for engines used in high performance motorsports including sled pulling, street racing, and drag racing, where high engine speeds and high boost applications are desired and where rules and regulations are often in place that do not allow for larger turbocharger frame sizes.

Traditional turbochargers have a large hex nut (or other style nut or fastener) on both the compressor/intake wheel and turbine/exhaust wheel. This feature, which is incorporated into the "hub" of the compressor/intake wheel and turbine/exhaust wheel, is used during the manufacturing process for many purposes (holding, fastening, tightening, etc.). For example, the hex nut can be used as a clamping device when assembling the turbocharger, during machining operations, and/or during welding processes. After assembly, this hex nut provides no functional purpose to the operation of the turbocharger.

SUMMARY

This section provides background information related to the present disclosure and is not necessarily prior art.

In accordance with one aspect of the subject disclosure, a turbocharger for an internal combustion engine is provided. The turbocharger includes a housing, a shaft, a turbine wheel, and a compressor wheel. The shaft is rotatable with respect to the housing and defines a centerline. The turbine wheel is mounted to the shaft and is disposed within the housing. The compressor wheel is also mounted to the shaft and is disposed within the housing. The turbine wheel and/or the compressor wheel has a plurality of blades with leading edges that converge at an apex. The apex is aligned with the centerline.

In accordance with another aspect of the subject disclosure, a turbine wheel for a turbocharger is provided. The turbine wheel includes a body that extends along a centerline between a leading end and a trailing end. The body has an outer circumference that is radially spaced from the centerline by a turbine radius. The turbine wheel also includes a plurality of turbine blades that are positioned on the body. The turbine blades have leading edges that converge at a turbine apex. The turbine apex is located at the leading end of the body and is aligned with the centerline of the body of the turbine wheel.

In accordance with another aspect of the subject disclosure, a compressor wheel for a turbocharger is provided. The compressor wheel includes a body that extends along a centerline between a leading end and a trailing end. The body has an outer circumference that is radially spaced from the centerline by a compressor radius. The compressor wheel also includes a plurality of compressor blades that are positioned on the body. The compressor blades have leading edges that converge at a compressor apex. The compressor apex is located at the leading end of the body and is aligned with the centerline of the body of the compressor wheel.

In accordance with another aspect of the subject disclosure, a method of constructing a turbocharger is provided. The method includes the steps of: machining a turbine wheel having a plurality of turbine blades, machining a compressor wheel having a plurality of compressor blades, creating leading edges on the plurality of turbine blades and the plurality of compressor blades, and performing a finishing operation on the turbine wheel and/or the compressor wheel to form an apex where the leading edges converge.

The nut and/or the nose of the hub on traditional turbine and compressor wheels creates a disturbance in the flow pattern and flow volume of the fluid passing through the turbine and the compressor. This limits horsepower potential. To increase power output, manufacturers typically up-size the frame of the turbocharger. The present disclosure advantageously allows for increased power output and efficiency while using the same frame size by eliminating the nut/fastener/hex on the nose of the hub. The strength of the blades does not lie within the center of the hub/shaft so removing the nut/fastener/hex on the nose of the hub does not compromise the structural integrity of the turbine wheel or the compressor wheel.

The turbocharger design of the subject disclosure provides greater horsepower output and throttle response by modifying the compressor/intake and turbine/exhaust wheels either in conjunction with each other or independently. The elimination of the large hex nut on the hub decreases weight, back-pressure, increases spool-up speed, increases wheel blade length, and alters wheel blade geometry. The flow obstruction created by the hex nut is eliminated to maximize fluid flow and blade length, which can significantly increase horsepower by 10 to 75 percent over conventional fastener nosed hub designs.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Referring to the Figures, wherein like numerals indicate corresponding parts throughout the several views, a turbocharger 20 is illustrated for use with an internal combustion engine (not shown).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
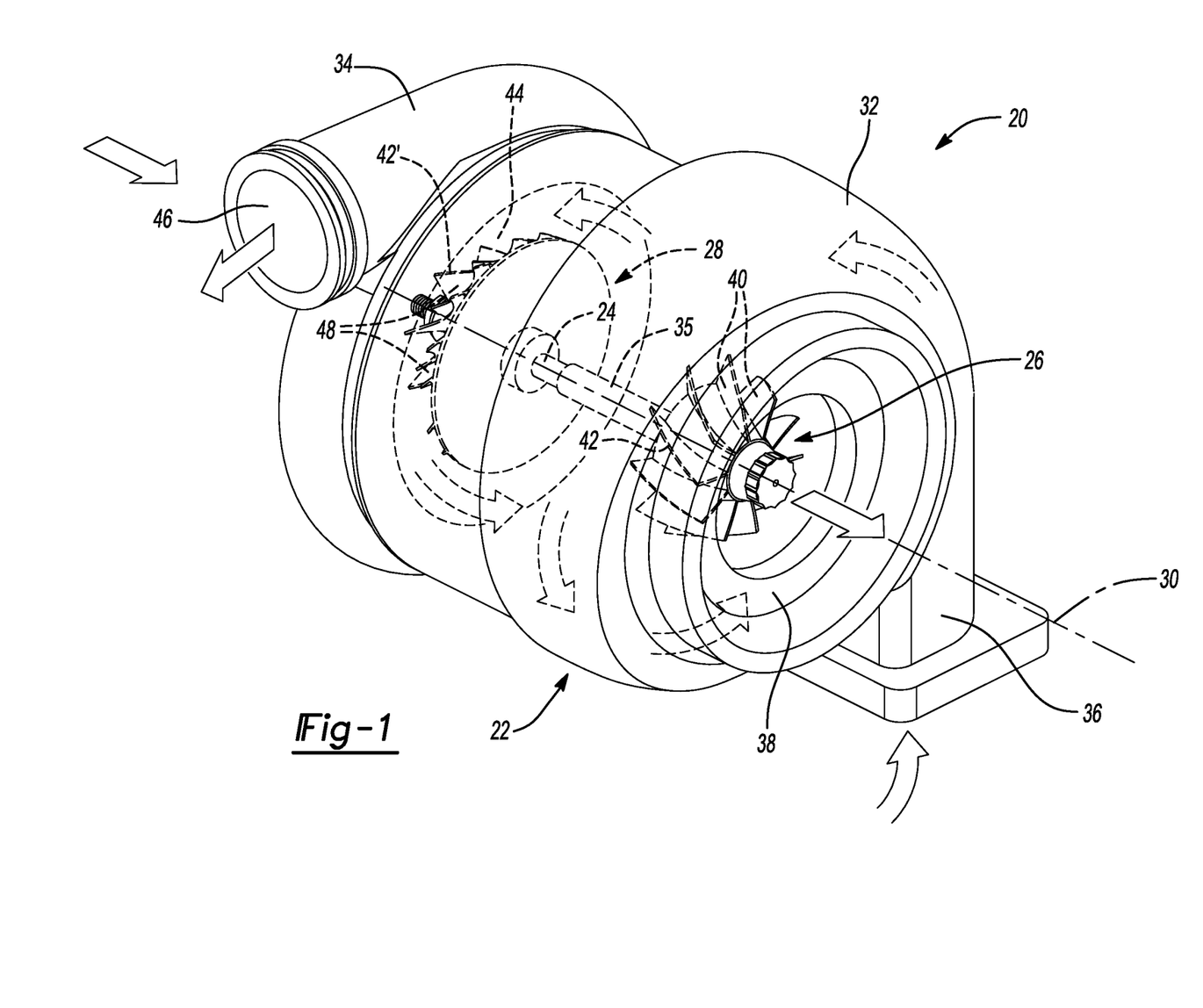
FIG. 1 is a perspective view of an exemplary turbocharger.
Figure 2:
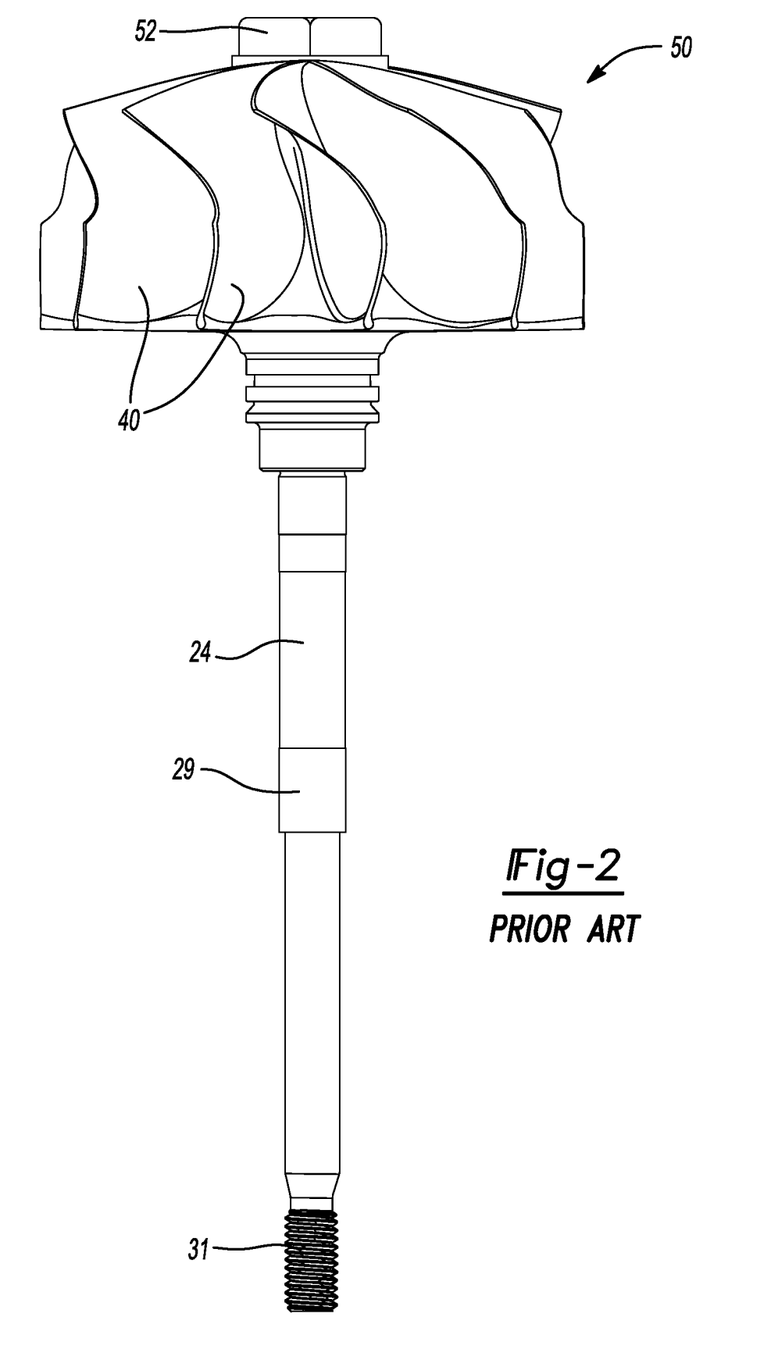
FIG. 2 is a side elevation view of a traditional turbine/exhaust wheel for the turbocharger shown in FIG. 1.

With reference to FIGS. 1 and 2, the turbocharger 20 includes a housing 22, a shaft 24, a turbine wheel 26, and a compressor wheel 28. The shaft 24 has an outer surface 29 and is rotatable with respect to the housing 22 and defines a centerline 30. Both the turbine wheel 26 and the compressor wheel 28 are mounted to the shaft 24. The shaft 24 may be a one-piece shaft 24, or alternatively may be split into multiple segments, such as a turbine segment and a compressor segment. The shaft 24 may optionally include a threaded end 31. The housing 22 includes a turbine section 32 and a compressor section 34. A bearing pack 35 is positioned between the turbine and compressor sections 32, 34 of the housing 22 for rotatably supporting the outer surface 29 of the shaft 24. The turbine section 32 of the housing 22 includes an exhaust inlet 36 that is radially spaced from the centerline 30 and an exhaust outlet 38 that is aligned with the centerline 30. The exhaust inlet 36 and the exhaust outlet 38 are configured to bolt to portions of the exhaust system of the internal combustion engine (not shown). Exhaust gases enter the housing 22 through the exhaust inlet 36 and exit the housing 22 through the exhaust outlet 38. The turbine wheel 26 is disposed in the turbine section 32 of the housing 22 and includes a plurality of turbine blades 40 with leading edges 42 that face the exhaust outlet 38. The flow of exhaust gas pushes against the turbine blades 40, which drives rotation of the turbine wheel 26.

The compressor section 34 of the housing 22 includes an air inlet 44 that is aligned with the centerline 30 and an air outlet 46 that is radially spaced from the centerline 30. The air inlet 44 is configured to receive air from the surrounding environment either directly or through an intake system (not shown). The air outlet 46 is configured to be connected to an intake manifold of the internal combustion engine via an inlet conduit (not shown), which may optionally include an intercooler (not shown). The compressor wheel 28 is disposed in the compressor section 34 of the housing 22 and includes a plurality of compressor blades 48 with leading edges 42' that face the air inlet 44. Rotation of the turbine wheel 26 drives rotation of the compressor wheel 28 via the shaft 24. The compressor blades 48 pump air through the compressor section 34 of the housing 22 as the compressor wheel 28 rotates and discharge the air through the air outlet 46 at a higher pressure (boost) for delivery to the internal combustion engine.

Figure 3:
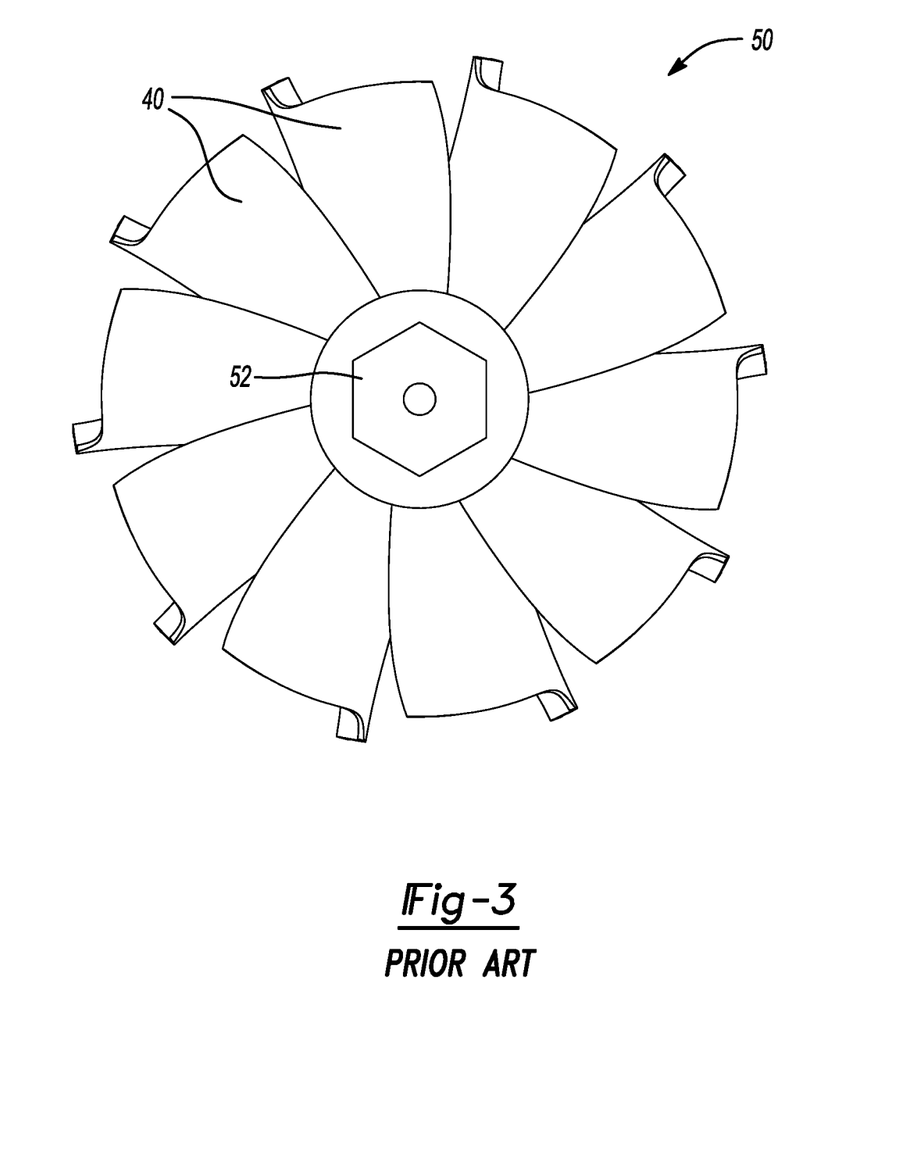
FIG. 3 is a front elevation view of the traditional turbine/exhaust wheel shown in FIG. 2.

With additional reference to FIG. 3, typical turbine or exhaust wheels 50 (used interchangeably herein) are generally manufactured using high temperature alloys (e.g., Inconel) to withstand the heat and pressure that turbine or exhaust wheels 50 are exposed to by the exhaust flowing through the turbine section 32 of the turbocharger housing 22. Typical exhaust temperatures at the exhaust inlet 36 of a turbocharger 20 range from 1,000 to 2,000 degrees Fahrenheit. Turbine or exhaust wheels 50 are manufactured either by casting or machining a forged alloy. During manufacturing, a hub 52 is used as a means to hold or clamp the turbine or exhaust wheel 50 in place. For example, the hub 52 is used to hold the turbine or exhaust wheel 50 when it is fused or friction welded to the shaft 24. The hub 52 is generally large and left in place throughout the manufacturing process, the finishing process, and the final turbocharger assembly process. The hub 52 on traditional turbine or exhaust wheels 50 obstructs fluid flow through the turbine section 32 of the housing 22 and therefore limits the horsepower potential of the turbocharger 20.

Figure 4:
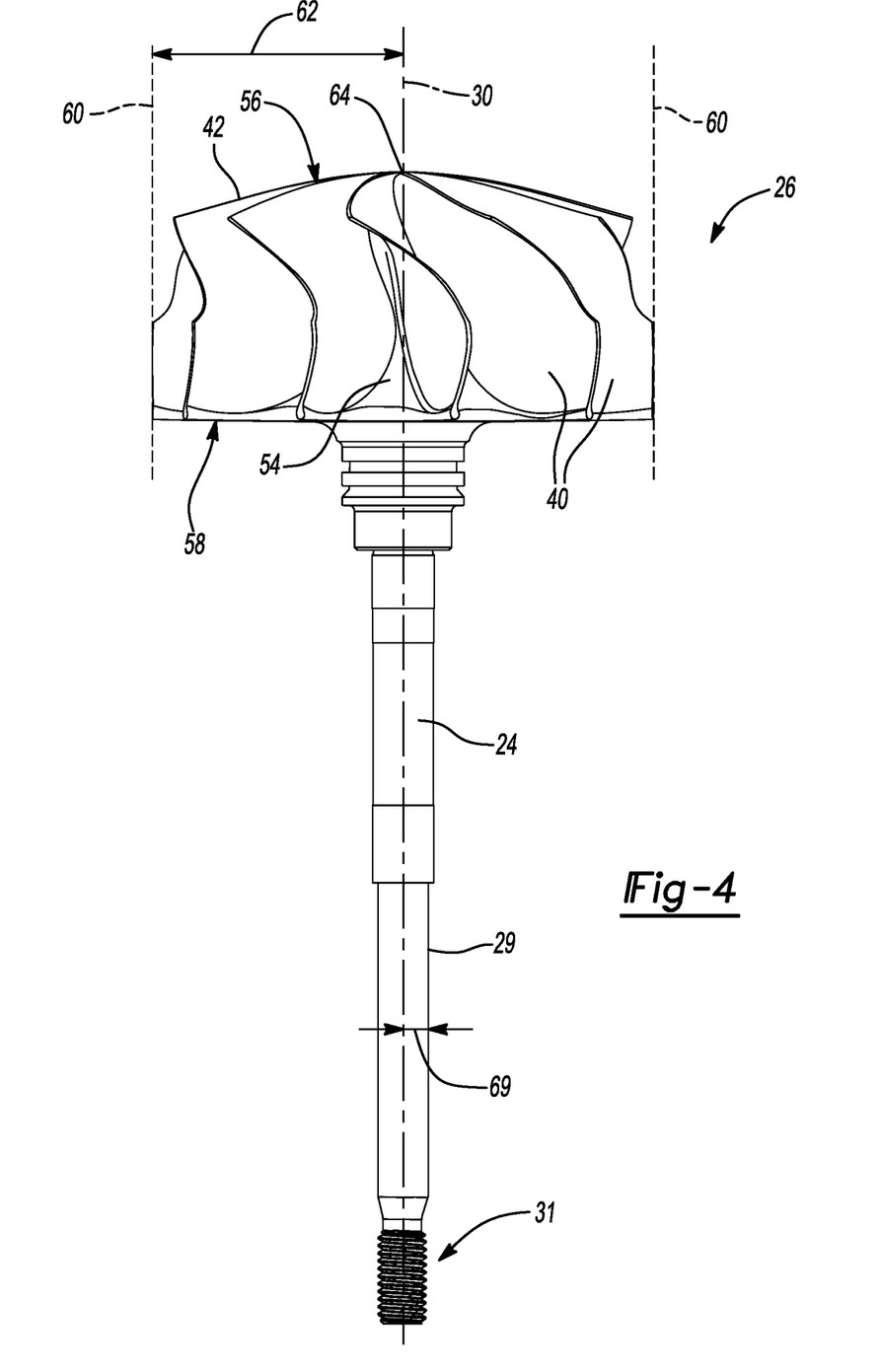
FIG. 4 is a side elevation view of an exemplary nose-less turbine/exhaust wheel for the turbocharger shown in FIG. 1 where the exemplary nose-less turbine/exhaust wheel has been constructed in accordance with the teachings of the present disclosure.
Figure 5:
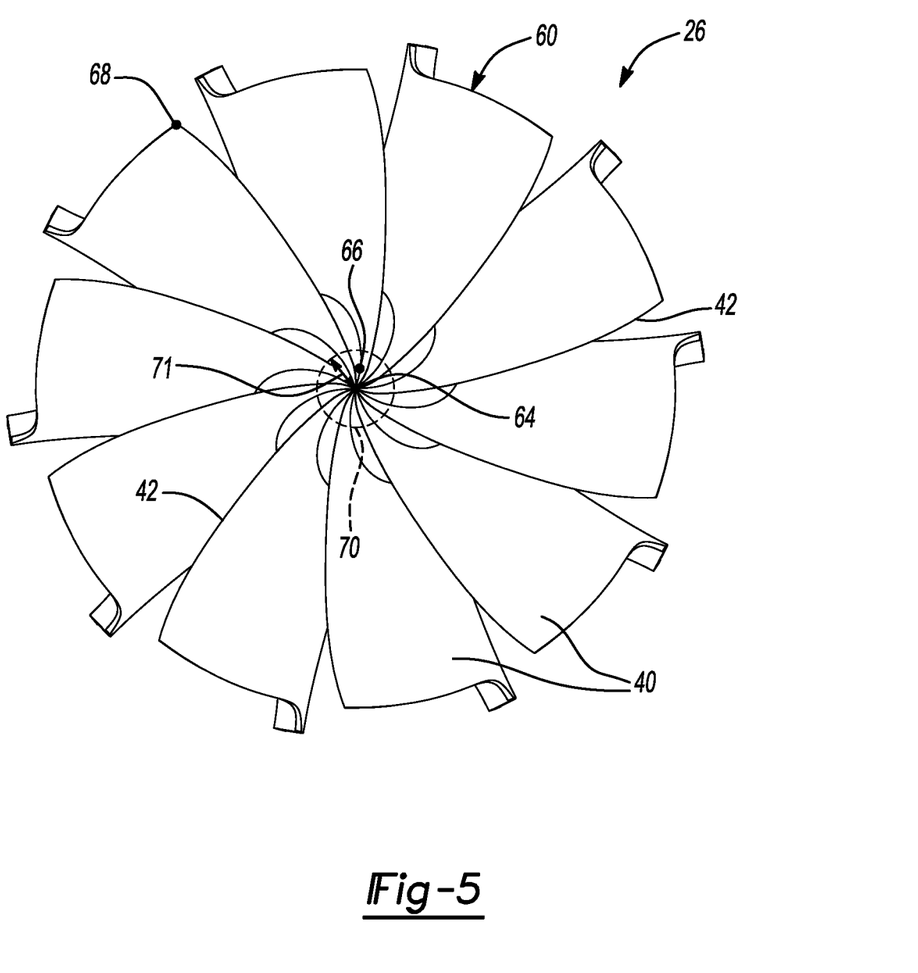
FIG. 5 is a front elevation view of the exemplary nose-less turbine/exhaust wheel shown in FIG. 4.

In accordance with the subject disclosure, the hub 52 on the turbine or exhaust wheel 50 is removed and/or eliminated and the turbine blades 40 are re-shaped to an optimal geometry to create turbine wheel 26 (see FIGS. 4 and 5). This change decreases weight, increases surface area, provides increased exhaust-to-blade contact and therefore increases the efficiency and power output of the turbocharger 20. Removing the hub 52 and manipulating the fluid flow provides a significant horsepower increase and efficiency advantage for all turbochargers.

With reference to FIGS. 4 and 5, the turbine wheel 26 of the turbocharger 20 includes a turbine body 54 that extends along the centerline 30 between a leading end 56 and a trailing end 58. The turbine body 54 has an outer circumference 60 that is radially spaced from the centerline 30 by a turbine radius 62. The turbine blades 40 are positioned on the turbine body 54. The turbine blades 40 have leading edges 42 that converge at a turbine apex 64 located at the leading end 56 of the turbine body 54. The turbine apex 64 is aligned with the centerline 30. The leading edges 42 of the turbine blades 40 extend helically from an inboard point 66 to an outboard point 68. In one configuration, the inboard points 66 of the leading edges 42 touch one another and form a pointed shape at the turbine apex 64. In another configuration, the inboard points 66 of the leading edges 42 are positioned closer to the centerline 30 than the smallest radius 69 of the shaft 24. In other words, the inboard points 66 of the leading edges 42 are positioned within an imaginary circle 70 drawn around the centerline 30 that has a radius 71 equal to the smallest radius 69 of the shaft 24. The imaginary circle 70 therefore coincides with the outer surface 29 of the shaft 24 and the inboard points 66 of the leading edges 42 are position either on the centerline 30 itself or radially between the centerline 30 and the imaginary circle 70.

Figure 6:
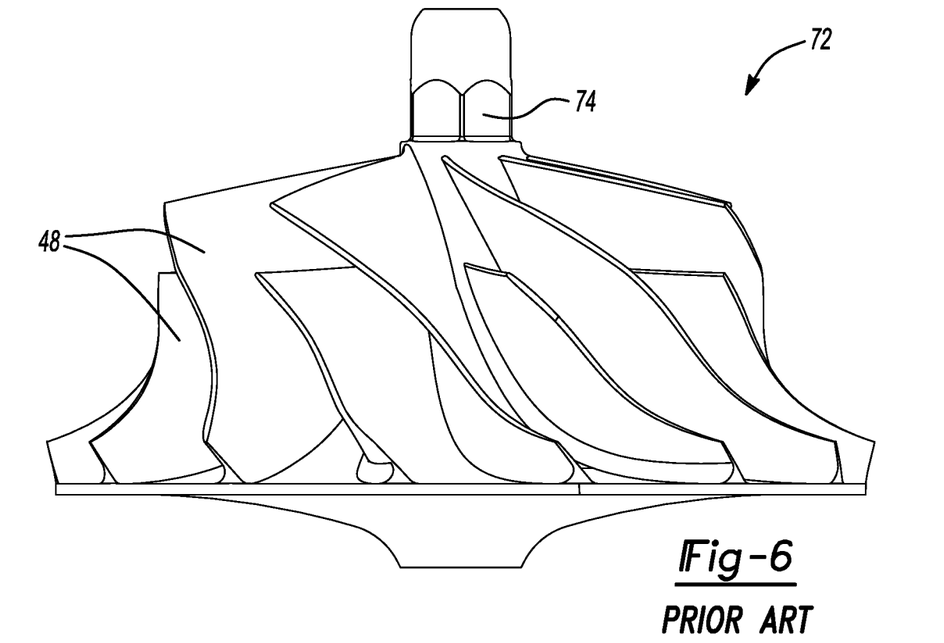
FIG. 6 is a side elevation view of a traditional intake/compressor wheel for the turbocharger shown in FIG. 1.
Figure 7:
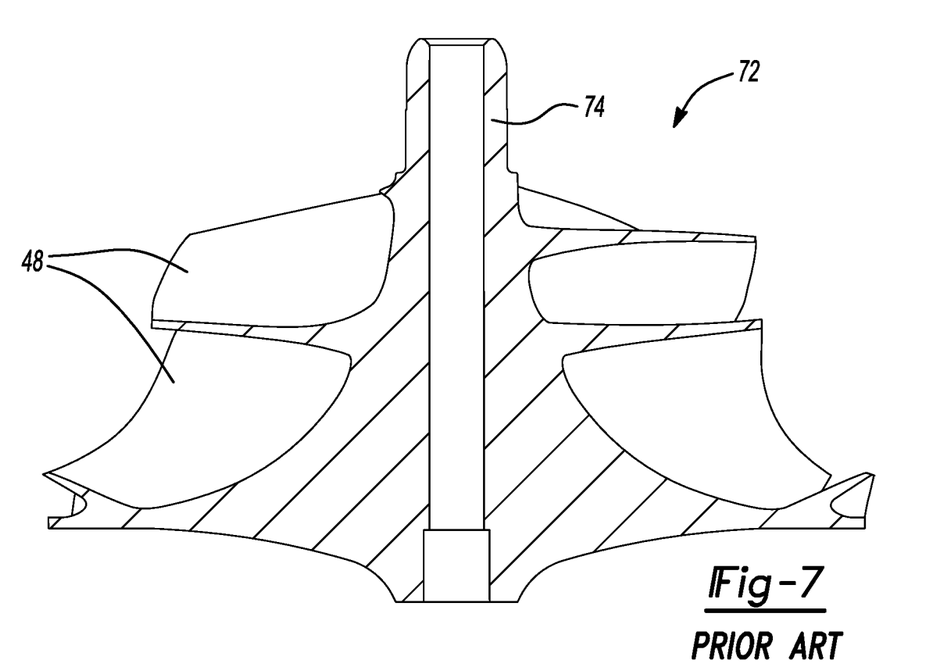
FIG. 7 is a side section view of the traditional intake/compressor wheel shown in FIG. 6.
Figure 8:
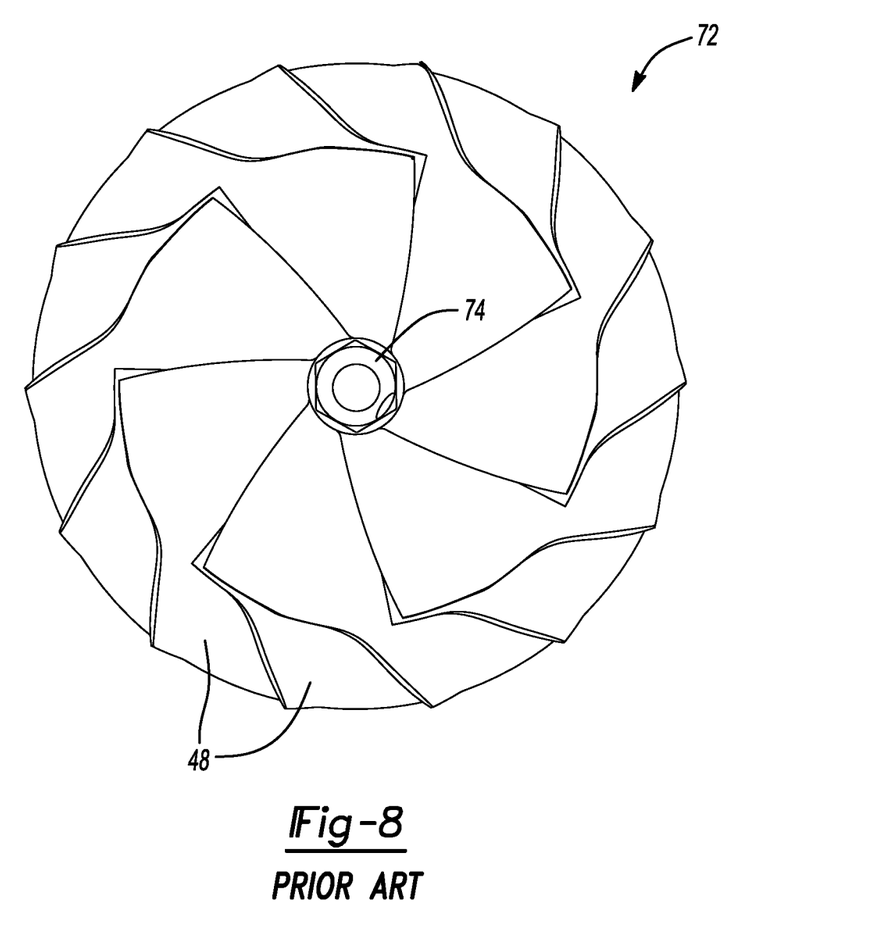
FIG. 8 is a front elevation view of the traditional intake/compressor wheel shown in FIG. 6.

With reference to FIGS. 6-8, typical compressor or intake wheels 72 (used interchangeably herein) are generally cast or machined out of a solid forging (i.e., aluminum, titanium, etc.). The compressor or intake wheel 72 has a nut 74 (hub) at its center-point. This nut 74 is used in the final assembly process and/or when building or servicing the turbocharger 20. The nut 74 on the compressor or intake wheel 72 is used to secure the compressor or intake wheel 72 to the shaft 24 during final assembly. This nut 74 also creates an obstruction to airflow and limits the horsepower potential of the turbocharger 20, especially in racing or high horsepower, high rpm, high engine speed (i.e., high rpm), and high boost applications.

Figure 9:
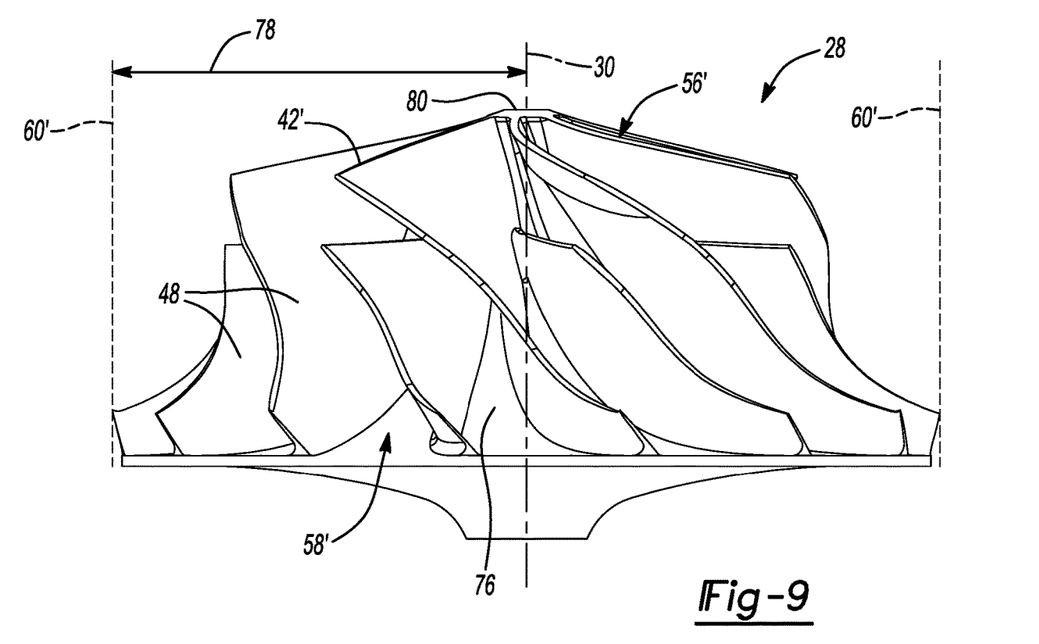
FIG. 9 is a side elevation view of an exemplary nose-less intake/compressor wheel for the turbocharger shown in FIG. 1 where the exemplary nose-less intake/compressor wheel has been constructed in accordance with the teachings of the present disclosure.
Figure 10:
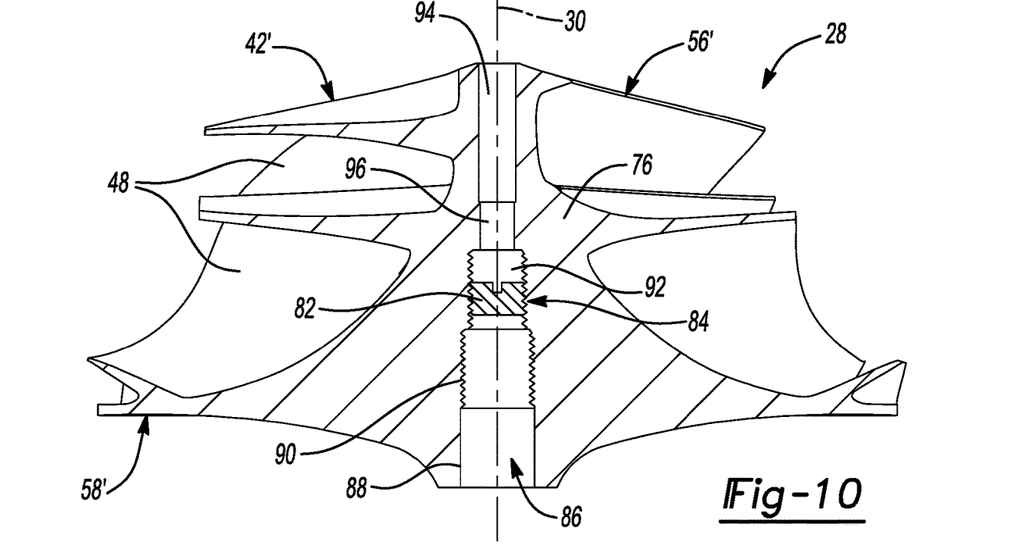
FIG. 10 is a side section view of the exemplary nose-less intake/compressor wheel shown in FIG. 9.
Figure 11:
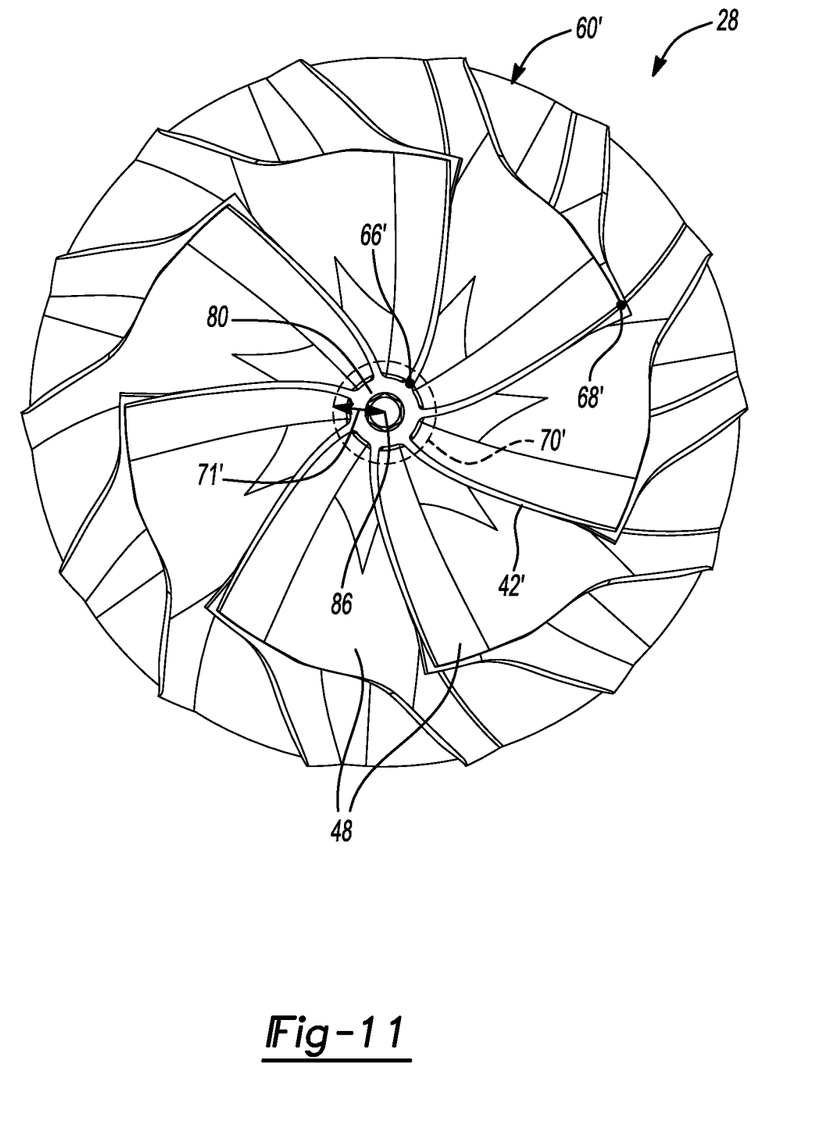
FIG. 11 is a front elevation view of the exemplary nose-less intake/compressor wheel shown in FIG. 9.

In accordance with the subject disclosure, the nut 74 on the compressor or intake wheel 72 is removed and/or eliminated and the compressor blades 48 are re-shaped to an optimal geometry to create compressor wheel 28.

With reference to FIGS. 9-11, the compressor wheel 28 of the turbocharger 20 includes a compressor body 76 that extends along the centerline 30 between a leading end 56' and a trailing end 58'. The compressor body 76 has an outer circumference 60' that is radially spaced from the centerline 30 by a compressor radius 78. The compressor blades 48 are positioned on the compressor body 76. The compressor blades 48 have leading edges 42' that converge at a compressor apex 80 located at the leading end 56' of the compressor body 76. The compressor apex 80 is aligned with the centerline 30. The leading edges 42' of the compressor blades 48 extend helically from an inboard point 66' to an outboard point 68'. In one configuration, the inboard points 66' of the leading edges 42' touch one another and form a pointed shape at the compressor apex 80. In another configuration, the inboard points 66' of the leading edges 42' are positioned closer to the centerline 30 than the smallest radius 69 of the shaft 24. In other words, the inboard points 66' of the leading edges 42' are positioned within an imaginary circle 70' drawn around the centerline 30 that has a radius 71' equal to the smallest radius 69 of the shaft 24. The imaginary circle 70' therefore coincides with the outer surface 29 of the shaft 24 and the inboard points 66' of the leading edges 42' are position radially between the centerline 30 and the imaginary circle 70'.

Alternative configurations for attachment of the compressor wheel 28 to the shaft 24 are provided, where a set screw 82, such as a hex screw, Allen screw, or similar style through-bore fastener, is threaded into the compressor wheel 28. The nut 74 is eliminated and therefore does not interfere with airflow. This provision decreases weight, increases potential horsepower, air-flow, boost pressure, and compressor speed.

In the illustrated examples, both the turbine wheel 26 and the compressor wheel 28 have a plurality of blades 40, 48 with leading edges 42, 42' that converge at apexes 64, 80 that are aligned with the centerline 30. However, it should be appreciated that other configurations are possible where only the turbine wheel 26 is provided with an apex 64 or where only the compressor wheel 28 is provided with an apex 80. The apexes 64, 80 may be formed by either removing the hex nut 74, hub 52, or other manufacturing fixture from the leading ends 56, 56' of the turbine or exhaust wheel 50 and/or the compressor or intake wheel 72 prior to assembly or by eliminating the hex nut 74, hub 52, or other manufacturing fixture altogether from the manufacturing process. Regardless, the turbine wheel 26 and/or the compressor wheel 28 in final assembled form have a nut-less/hub-less configuration, meaning that there is no nut 74 or hub 52 adjacent to the leading ends 56, 56' of the turbine wheel 26 and the compressor wheel 28.

Although other configurations are possible, in the illustrated example, the turbine wheel 26 is welded to the shaft 24 while the compressor wheel 28 is attached to the shaft 24 by a threaded connection 84 and set screw 82 (shown in FIG. 10). The compressor wheel 28 includes a through-bore 86 with multiple stepped portions 88, 90, 92. The first stepped portion 88 has a smooth, cylindrical shape and receives a portion of the shaft 24. The second stepped portion 90 is threaded and threadably engages the threaded end 31 of the shaft 24. The third stepped portion 92 is also threaded and threadably engages the set screw 82. The third stepped portion 92 has a diameter that is smaller than a diameter of the second stepped portion 90 and the diameter of the second stepped portion 90 is smaller than a diameter of the first stepped portion 88. The threads in the second and third stepped portions 90, 92 run in opposite directions. For example, the second stepped portion 90 may be provided with left-hand threads while the third stepped portion 92 may be provided with right-hand threads, or vice versa. The through-bore 86 also includes an end portion 94 adjacent to the compressor apex 80 that has hexagonally-shaped internal walls (i.e., a hex recess) that are configured to receive a tool for tightening the compressor wheel 28 on the threaded end 31 of the shaft 24. A tool pathway 96 extends along the centerline 30 between the third stepped portion 92 and the end portion 94. The tool pathway 96 provides tool access to the set screw 82, which prevents the compressor wheel 28 from becoming over-tightened (i.e., over torqued) on the threaded end 31 of the shaft 24. As a result, the turbine apex 64 and/or the compressor apex 80 are unobstructed by a nut 74, hub 52, or other fastener. It should be appreciated that this arrangement may be reversed where the compressor wheel 28 is welded to the shaft 24 and the turbine wheel 26 is connected to the shaft 24 by set screw 82 and threaded connection 84. Alternatively, both the turbine wheel 26 and the compressor wheel 28 may be connected to the shaft 24 via respective set screws 82 and threaded connections 84.

A method of constructing the turbocharger 20 described above is also provided. The method includes the steps of: machining a turbine wheel 26 having a plurality of turbine blades 40, machining a compressor wheel 28 having a plurality of compressor blades 48, creating leading edges 42, 42' on the plurality of turbine blades 40 and the plurality of compressor blades 48, and performing a finishing operation on the turbine wheel 26 and/or the compressor wheel 28 to form apexes 64, 80 where the leading edges 42, 42' converge. The finishing operation may include removing a nut 74, hub 52, or other manufacturing/machining fixture from the turbine or exhaust wheel 50 and/or the compressor or intake wheel 72 and extending the leading edges 42, 42' towards a centerline 30 of the turbine wheel 26 and/or the compressor wheel 28. As an alternative to machining the turbine wheel 26 and the compressor wheel 28, the turbine wheel 26 and the compressor wheel 28 can be cast, forged, or milled into the appropriate shape.

Optionally, the method may include the additional step of mounting the turbine wheel 26 and/or the compressor wheel 28 to a shaft 24 using a welding operation so that the apexes 64, 80 are unobstructed by a nut 74, hub 52, or other fastener. Alternatively, the method may include additional steps of mounting the turbine wheel 26 and/or the compressor wheel 28 to a shaft 24 using a countersunk set screw 82 so that the apexes 64, 80 are unobstructed by a nut 74, hub 52, or other fastener. In accordance with this method of attachment, the set screw 82 is threaded into the third stepped portion 92 of the through-bore 86 of the compressor wheel 28. The threaded end 31 of the shaft 24 is then threaded into the second stepped portion 90 of the through-bore 86. A tool (such as a hex tool) is inserted into the end portion 94 and the tool pathway 96 of the through-bore 86 to set the depth of the set screw 82 in the third stepped portion 92 of the through-bore 86. A larger hex tool (e.g., an Allen key) is inserted into the end portion 94 of the through-bore 86 to rotate the compressor wheel 28 relative to the shaft 24 until the threaded end 31 of the shaft 24 tightens against the set screw 82. Advantageously, this attachment mechanism between the compressor wheel 28 and the shaft 24 is easy to loosen/disassemble, even after extended periods of turbocharger use. This is an improvement over existing designs, where the high-speed rotation of the compressor wheel 28 during turbocharger operation over-tightens (i.e., over-torques) the compressor wheel 28 on the threaded end 31 of the shaft 24 making it difficult disassemble. The set screw 82 in the subject design stops further tightening of the compressor wheel 28 on the threaded end 31 of the shaft 24 during use. The set screw 82 also prevents over-torqueing of the compressor wheel 28 on the shaft 24 during or after assembly, which can bend the shaft 24 and create wobble in the turbocharger 20 and damage the bearing pack 35 and/or the turbocharger 20.

Eliminating the nut 74 and/or hub 52 on both the turbine or exhaust wheel 50 and the compressor or intake wheel 72 greatly improves fluid flow and in-turn increases the potential horsepower and efficiency of the turbocharger 20. This manufacturing change is applicable to all wheel sizes, frame sizes, and area/radius (A/R) combinations for all turbocharger applications. The result is a dual apex turbocharger 20 with decreased weight and increased speed capability.

The designs disclosed herein advantageously provide more power using the same footprint. Because output can be increased without increasing the frame size and A/R of the housing 22, the subject disclosure is particularly useful when there are space limitations on the packaging dimensions of the turbocharger 20 (e.g., where the turbocharger 20 fits between the cylinder banks of the internal combustion engine) or in motorsports applications with class restrictions and rules that limit wheel size and other size dimensions of the turbocharger 20.

Many modifications and variations of the subject matter disclosed herein are possible in light of the above teachings and may be practiced otherwise than as specifically described while within the scope of the appended claims. It should be appreciated that variations of the disclosed designs are possible without completely eliminating the hex nut 74 or the hub 52. For example and without limitations, the size of the nut 74 or hub 52 may be reduced and/or the nut 74 or hub 52 may be coned to form the apexes 64, 80.

What is claimed is:

1. A turbocharger for an internal combustion engine, comprising:
    a housing;
    a shaft rotatable with respect to the housing and defining a centerline;
    a turbine wheel mounted to the shaft and disposed within the housing;
    a compressor wheel mounted to the shaft and disposed within the housing; and
    at least one of the turbine wheel and the compressor wheel having a plurality of blades with leading edges that converge at an apex that is aligned with the centerline, wherein the leading edges of the plurality of blades extend helically from an inboard point to an outboard point, wherein the shaft has a radius and the inboard points of the leading edges are positioned closer to the centerline than the radius of the shaft.

2. The turbocharger as set forth in claim 1, wherein the inboard points of the leading edges touch one another at the centerline and form the apex.

3. The turbocharger as set forth in claim 1, wherein the housing includes a turbine section with an exhaust inlet that is radially spaced from the centerline and an exhaust outlet that is aligned with the centerline.

4. The turbocharger as set forth in claim 3, wherein the turbine wheel is disposed in the turbine section of the housing and includes a plurality of turbine blades with leading edges that face the exhaust outlet.

5. The turbocharger as set forth in claim 1, wherein the housing includes a compressor section with an air inlet that is aligned with the centerline and an air outlet that is radially spaced from the centerline.

6. The turbocharger as set forth in claim 5, wherein the compressor wheel is disposed in the compressor section of the housing and includes a plurality of compressor blades with leading edges that face the air inlet.

7. The turbocharger as set forth in claim 1, wherein both the turbine wheel and the compressor wheel have a plurality of blades with leading edges that converge at an apex that is aligned with the centerline.

8. The turbocharger as set forth in claim 1, wherein at least one of the turbine wheel and the compressor wheel have a hub-less configuration.

9. The turbocharger as set forth in claim 1, wherein the apex is unobstructed by a nut or other fastener.

10. The turbocharger as set forth in claim 1, wherein at least one of the turbine wheel and the compressor wheel has a body that is attached to the shaft by a set screw that is countersunk into a leading end of the body.

11. A turbine wheel for a turbocharger, comprising:
a body mounted to a shaft, the body extending along a centerline between a leading end and a trailing end, the body having an outer circumference that is radially spaced from the centerline by a turbine radius; and
a plurality of turbine blades positioned on the body, the plurality of turbine blades having leading edges that converge at a turbine apex located at the leading end of the body, wherein the turbine apex is aligned with the centerline,
wherein the leading edges of the turbine blades extend helically from an inboard point at the turbine apex to an outboard point,
wherein the shaft has a radius and the inboard points of the leading edges are positioned closer to the centerline than the radius of the shaft.

12. The turbine wheel as set forth in claim 11, wherein the inboard points of the leading edges of the turbine blades touch one another at the centerline and form the turbine apex.

13. A compressor wheel for mounting on a shaft, comprising:
a body extending along a centerline between a leading end and a trailing end, the body having an outer circumference that is radially spaced from the centerline by a compressor radius and a bore having a threaded portion with a radius that is sized to receive the shaft; and
a plurality of compressor blades positioned on the body, the plurality of compressor blades having leading edges that converge at a compressor apex located at the leading end of the body, wherein the compressor apex is aligned with the centerline,
wherein the leading edges of the compressor blades extend helically from an inboard point at the compressor apex to an outboard point,
wherein the inboard points of the leading edges are positioned closer to the centerline than the radius of the threaded portion of the bore.

14. The compressor wheel as set forth in claim 13, wherein the inboard points of the leading edges of the compressor blades touch one another at the centerline and form the compressor apex.

\* \* \* \* \*